United States Patent
Ikeda et al.

(10) Patent No.: US 11,710,869 B2
(45) Date of Patent: Jul. 25, 2023

(54) VEHICLE BATTERY PACK

(71) Applicant: SUBARU CORPORATION, Tokyo (JP)

(72) Inventors: Shunsuke Ikeda, Tokyo (JP); Shinichi Kimura, Tokyo (JP); Yukio Karasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 351 days.

(21) Appl. No.: 16/942,914

(22) Filed: Jul. 30, 2020

(65) Prior Publication Data

US 2021/0091430 A1   Mar. 25, 2021

(30) Foreign Application Priority Data

Sep. 25, 2019   (JP) .................. 2019-174072

(51) Int. Cl.
  *H01M 10/6563* (2014.01)
  *H01M 10/625* (2014.01)
  *H01M 10/613* (2014.01)

(52) U.S. Cl.
  CPC ..... *H01M 10/6563* (2015.04); *H01M 10/613* (2015.04); *H01M 10/625* (2015.04); *H01M 2220/20* (2013.01)

(58) Field of Classification Search
  CPC ............. H01M 10/613; H01M 10/625; H01M 10/6563
  See application file for complete search history.

(56) References Cited

U.S. PATENT DOCUMENTS

| | | | | |
|---|---|---|---|---|
| 5,937,664 A | * | 8/1999 | Matsuno | H01M 10/625 62/186 |
| 2009/0257190 A1 | * | 10/2009 | Yoda | H01M 10/667 361/690 |
| 2009/0260905 A1 | * | 10/2009 | Shinmura | H01M 10/6566 165/104.11 |

(Continued)

FOREIGN PATENT DOCUMENTS

| | | |
|---|---|---|
| JP | 4582205 B2 | 11/2010 |
| JP | 2011-258426 A | 12/2011 |
| JP | 2015-153464 A | 8/2015 |

*Primary Examiner* — Jonathan G Jelsma
(74) *Attorney, Agent, or Firm* — Smith, Gambrell & Russell, LLP (57) ABSTRACT

A vehicle battery pack for an electric vehicle includes a battery, a battery-cooling-air channel, a fume exhaust channel, a fume-ventilation restricting unit, a temperature sensor, a blower fan, and a controller. Cooling air that cools the battery flows through the battery-cooling-air channel. Fumes generated from the battery flow through the fume exhaust channel. The fume exhaust channel is coupled to the battery-cooling-air channel. The fume-ventilation restricting unit closes off the fume exhaust channel from the battery-cooling-air channel in a normal state, whereas causing the battery-cooling-air channel and the fume exhaust channel to communicate with each other in an abnormal state. The temperature sensor detects a temperature of the fumes. The controller controls the blower fan, and increase the air volume of the blower fan on the basis of the temperature detected by the temperature sensor.

20 Claims, 8 Drawing Sheets

(56) References Cited

U.S. PATENT DOCUMENTS

| | | | |
|---|---|---|---|
| 2010/0112419 A1* | 5/2010 | Jang | H01M 10/63 |
| | | | 429/62 |
| 2011/0027632 A1* | 2/2011 | Higashino | H01M 10/6563 |
| | | | 429/83 |
| 2011/0059341 A1 | 3/2011 | Matsumoto | |
| 2012/0237803 A1* | 9/2012 | Mardall | H01M 50/35 |
| | | | 429/53 |

* cited by examiner

VEHICLE BATTERY PACK

CROSS-REFERENCE TO RELATED APPLICATIONS

The present application claims priority from Japanese Patent Application No. 2019-174072 filed on Sep. 25, 2019, the entire contents of which are hereby incorporated by reference.

BACKGROUND

The disclosure relates to a vehicle battery pack.

Passenger hybrid vehicles and passenger electric vehicles are provided with rechargeable batteries. In recent years, the capacity of rechargeable batteries for vehicles has been increasing. Examples of a rechargeable battery mountable on a vehicle include a "battery cell" which is a module containing multiple lithium-ion batteries. Lithium-ion batteries have a problem that they generate gas when an abnormality, such as internal short-circuiting, occurs. Some techniques are known that address the problem caused by the gas generated from a rechargeable battery including a battery cell that contains lithium-ion batteries in an abnormal state. These techniques involve ejecting the gas generated in an abnormal state to the outside of the battery cell through a release valve of the battery cell, and discharging the gas to the outside through a duct.

Japanese Unexamined Patent Application Publication No. 2011-258426 discloses a secondary battery pack having an air channel applicable to both cooling air and gas.

Japanese Unexamined Patent Application Publication No. 2015-153464 discloses a battery module having a gas guiding channel through which the gas generated in an abnormal state flows and a cooling air channel coupled to the gas guiding channel.

Japanese Patent No. 4582205 discloses an electric vehicle including a gas discharge channel through which the gas generated from a battery is discharged.

SUMMARY

An aspect of the technology provides a vehicle battery pack for an electric vehicle. The vehicle battery pack includes a battery, a battery-cooling-air channel, a fume exhaust channel, a fume-ventilation restricting unit, a temperature sensor, a blower fan, and a controller. Cooling air directed to cool the battery are to flow through the battery-cooling-air channel from inside the vehicle to outside the vehicle. Fumes are to be generated from the battery and to flow through the fume exhaust channel. The fume exhaust channel is coupled to the battery-cooling-air channel and configured to introduce the fumes to the battery-cooling-air channel. The fume-ventilation restricting unit is disposed at a merging site where the battery-cooling-air channel and the fume exhaust channel are to merge. The fume-ventilation restricting unit is configured to close off the fume exhaust channel from the battery-cooling-air channel in a normal state in which the fumes are not generated, and to cause the battery-cooling-air channel and the fume exhaust channel to communicate with each other in an abnormal state in which the fumes are generated. The temperature sensor is configured to detect a temperature of the fumes. The blower fan is configured to blow the cooling air. The controller is configured to control the blower fan, and increase the air volume of the blower fan on the basis of the temperature detected by the temperature sensor.

An aspect of the technology provides a vehicle battery pack for an electric vehicle. The vehicle battery pack includes a battery, a power converter, a power-converter cooling-air channel, a fume exhaust channel, a fume-ventilation restricting unit, a temperature sensor, a blower fan, and a controller. Cooling air directed to cool the power converter is to flow through the power-converter cooling-air channel from inside the vehicle to outside the vehicle. Fumes are to be generated from the battery flow through the fume exhaust channel. The fume exhaust channel is coupled to the power-converter cooling-air channel and configured to introduce the fumes to the power-converter cooling-air channel. The fume-ventilation restricting unit is disposed at a merging site where the power-converter cooling-air channel and the fume exhaust channel are to merge. The fume-ventilation restricting unit is configured to close off the fume exhaust channel from the power-converter cooling-air channel in a normal state in which the fumes are not generated, and to cause the power-converter cooling-air channel and the fume exhaust channel to communicate with each other in an abnormal state in which the fumes are generated. The temperature sensor is configured to detect a temperature of the fumes. The blower fan is configured to blow the cooling air. The controller is configured to control the blower fan, and increase the air volume of the blower fan on the basis of the temperature detected by the temperature sensor.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

A vehicle battery pack 10 according to an example embodiment of the disclosure will now be described in detail with reference to the accompanying drawings. Throughout the present specification and the drawings, elements having substantially the same function and configuration are denoted with the same numerals to avoid any redundant description. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. In the description below, front, back, up, down, left, and right directions are defined on the condition that the left and right directions correspond to the left and right sides of a vehicle.

Figure 1A:
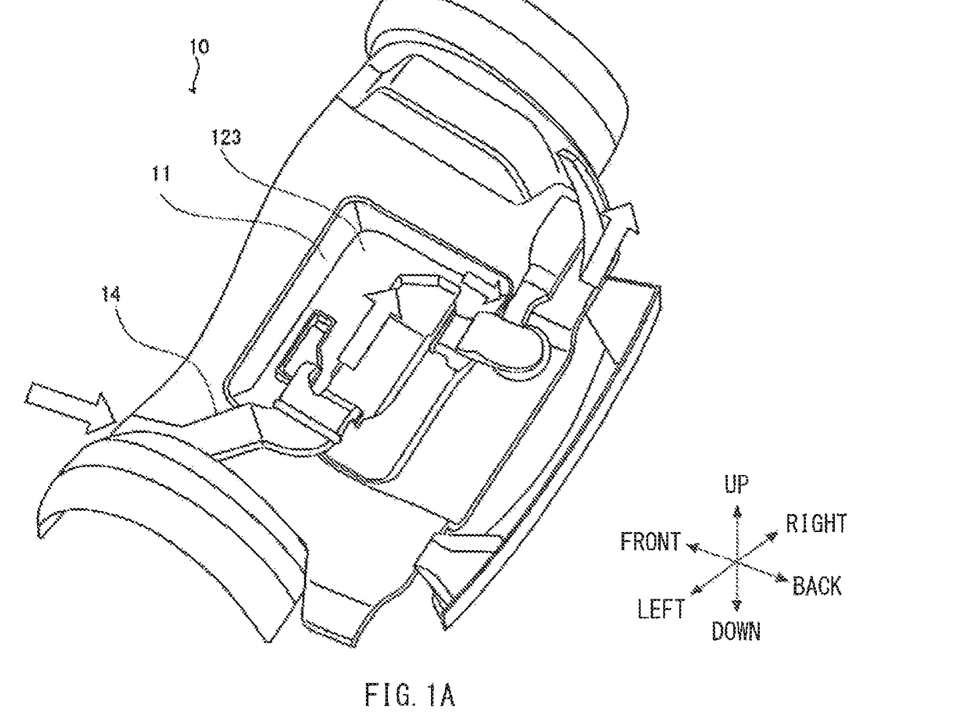
FIG. 1A is a perspective view of a rear portion of a vehicle in which a vehicle battery pack according to one example embodiment of the technology is disposed.
Figure 1B:
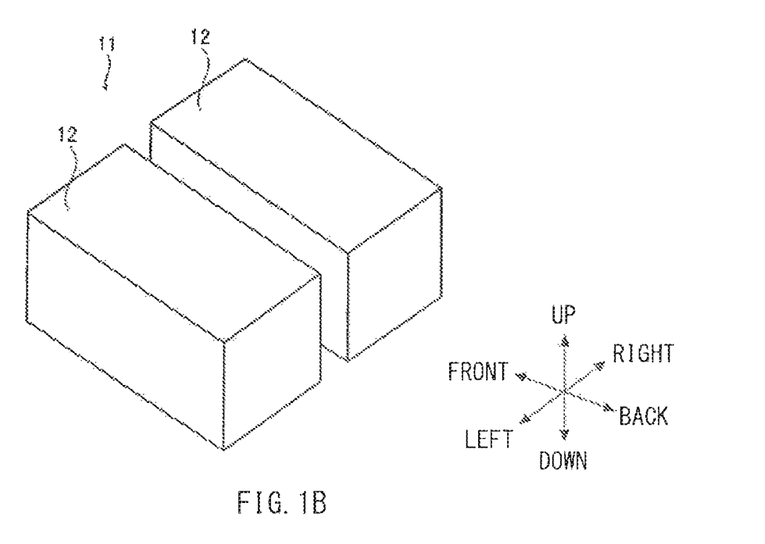
FIG. 1B is a perspective view of a battery of the vehicle battery pack illustrated in FIG. 1.

FIGS. 1A and 1B are perspective views of the vehicle battery pack 10. FIG. 1A is a perspective view of a rear portion of a vehicle in which the vehicle battery pack 10 is disposed. FIG. 1B is a perspective view of a battery 11. The vehicle battery pack 10 may also be referred to as a "vehicle battery module".

The vehicle battery pack 10 will now be described with reference to FIG. 1A. The vehicle battery pack 10 may supply electrical power to a motor and electric components of the vehicle, which is an electric vehicle. Examples of a vehicle on which the vehicle battery pack 10 is mounted may include an electric vehicle (EV), a hybrid electric vehicle (HEV), and a plug-in hybrid electric vehicle (PHEV).

The battery 11 may be accommodated in a battery case 123 disposed adjacent to the rear end of the vehicle. FIG. 1A does not illustrate a specific shape of the battery 11. A battery-cooling-air channel 14 may be disposed above the battery 11. The battery-cooling-air channel 14 may be an air channel through which cooling air for the battery 11 circulates. Cooling air may be introduced from the outside of the vehicle or the vehicle compartment to the battery-cooling-air channel 14 through an inlet in the front left side. The air having a raised temperature as a result of cooling the battery 11 may be discharged to the outside of the vehicle through an outlet in the rear right side. The air flowing in the battery-cooling-air channel 14 may cool the battery 11, so that the temperature of the battery 11 may be reduced to a temperature within a predetermined temperature range. This may maintain the discharging and charging characteristics of the battery 11 at a certain level or higher.

With reference to FIG. 1B, the battery 11 may include battery stacks 12 disposed side by side in the right-left direction. Although not illustrated, each battery stack 12 may include multiple battery cells stacked on each other in the front-rear direction. The battery stacks 12 may be secondary batteries including lithium-ion batteries or nickel-metal hydride batteries. Each battery cell of the battery stacks 12 may have a non-illustrated safety valve to release gas to the outside.

Figure 2:
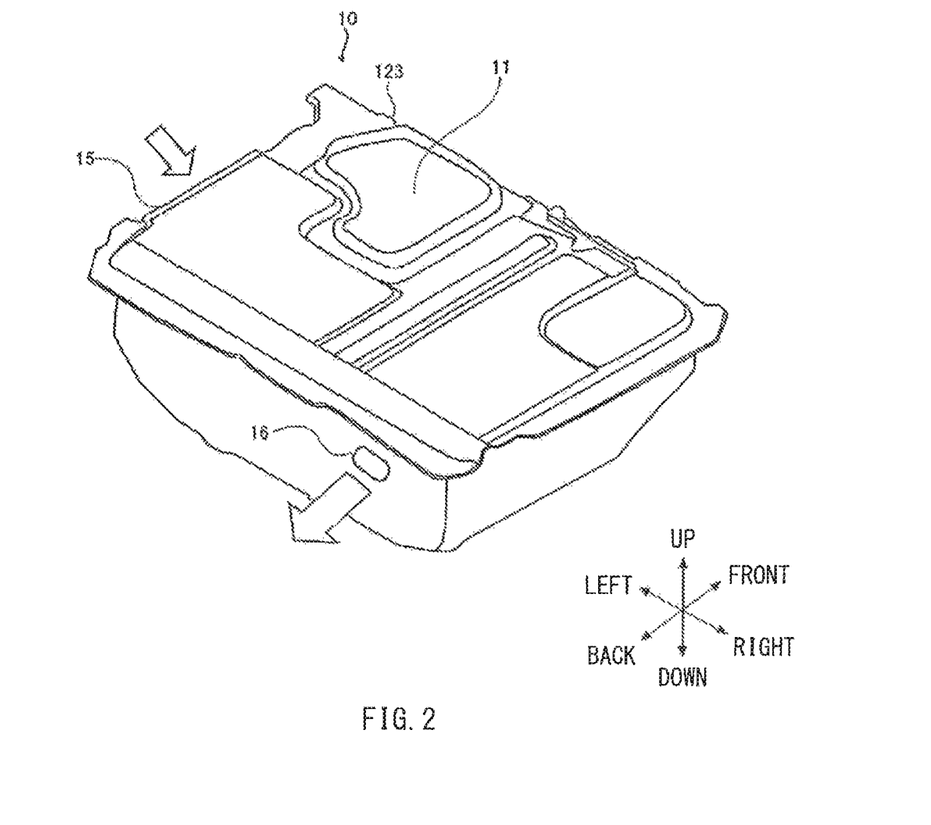
FIG. 2 is a perspective view of the vehicle battery pack according to one example embodiment of the technology.
Figure 3A:
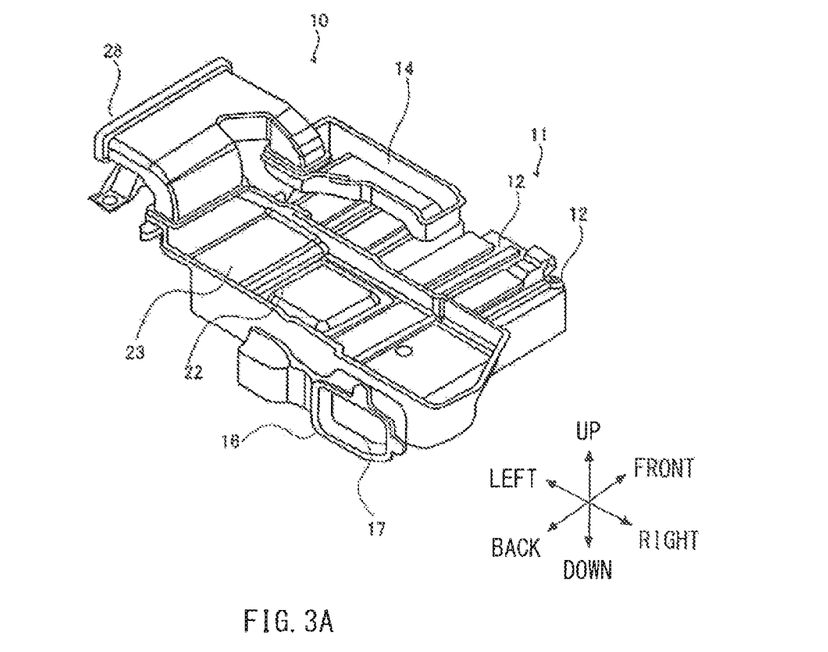
FIG. 3A is a perspective view of an exemplary air channel configuration in the vehicle battery pack according to one example embodiment.
Figure 3B:
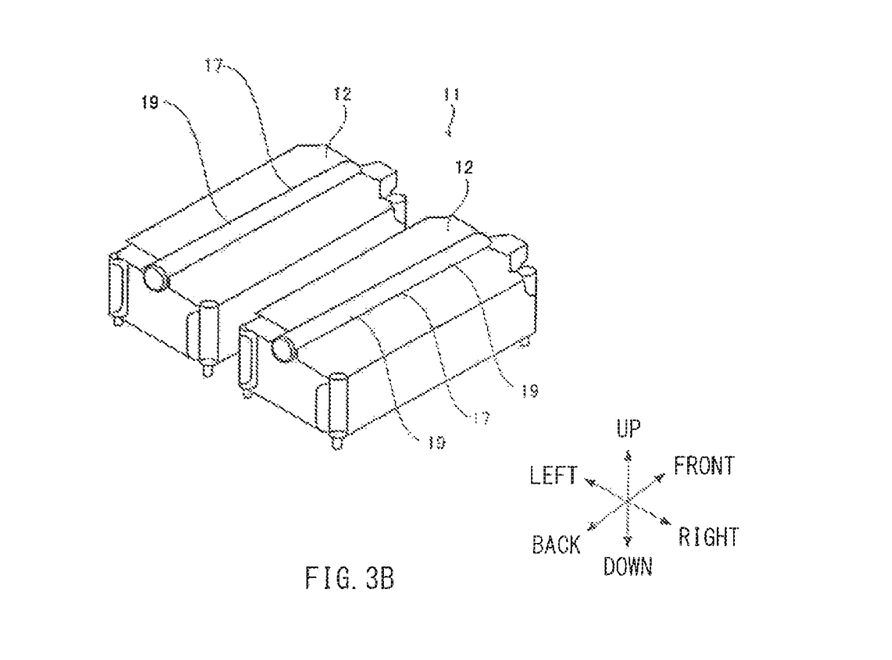
FIG. 3B is a perspective view of an exemplary configuration of battery stacks of the vehicle battery pack illustrated in FIG. 3A.

The configuration of the vehicle battery pack 10 will now be described in detail with reference to FIGS. 2, 3A, and 3B. FIG. 2 is a perspective view of the vehicle battery pack 10. FIG. 3A is a perspective view of the air channel configuration in the battery pack 10. FIG. 3B is a perspective view of the configuration of the battery stacks 12.

With reference to FIG. 2, the vehicle battery pack 10 may include the battery case 123 accommodating the battery 11. The battery case 123 also may accommodate air channels described below. A cooling air inlet 15 through which air is taken in may be formed in the left side face of the vehicle battery pack 10. A cooling air outlet 16 may be formed in the rear side face of the vehicle battery pack 10.

When the vehicle in which the vehicle battery pack 10 is mounted is driven, the battery 11 disposed inside the battery case 123 may generate heat by charging and discharging power. The battery 11 may be cooled by the cooling air introduced through the cooling air inlet 15. The air heated as a result of cooling the battery 11 may be discharged to the outside of the vehicle through the cooling air outlet 16. As described in detail below, in this example embodiment, at least a portion of the whole air channel may be shared between a cooling air channel for cooling the battery 11 and a fume exhaust channel through which fumes generated from the battery 11 in an abnormal state flow. This simplifies the overall configuration of the air channel.

FIG. 3A is a perspective view of the internal configuration of the battery case 123. The battery stacks 12 may be disposed side by side in the right-left direction. Each of the battery stacks 12 may be disposed such that the longitudinal sides thereof are parallel to the front-rear direction.

The battery-cooling-air channel 14 and a power-converter cooling-air channel 23 may be disposed on the upper faces of the battery stacks 12. An air duct 28 may be disposed on the left side of the battery stacks 12. The air duct 28 may have a left side coupled to the cooling air inlet 15 illustrated in FIG. 2, and a right side having a branched shape. The air duct 28 may have a rear end portion coupled to the power-converter cooling-air channel 23, and a front end portion coupled to the battery-cooling-air channel 14. The power-converter cooling-air channel 23 may be an air channel for cooling a power converter 22. As described above, the cooling air outlet 16 may be provided in the rear face of the vehicle battery pack 10. The cooling air outlet 16 may also serve as an outlet of a fume exhaust channel 17.

To cool the battery 11, the air introduced through the air duct 28 may flow into the battery-cooling-air channel 14 and the power-converter cooling-air channel 23. The air flowing through the power-converter cooling-air channel 23 may cool the power converter 22 and then be discharged through the cooling air outlet 16. The air fed to the battery-cooling-air channel 14 may cool the battery 11 and then be discharged through the cooling air outlet 16.

With reference to FIG. 3B, the fume exhaust channel 17 may be disposed on the upper face of each battery stack 12. The fume exhaust channel 17 may be a conduit disposed above the battery stack 12 along the front-rear direction. Although not illustrated, the fume exhaust channel 17 may communicate with exhaust valves of the battery cells. The battery-cooling-air channel 14 and the fume exhaust channel 17 may communicate with each other via a fume-ventilation restricting unit 18 inside the vehicle battery pack 10, as described below with reference to FIGS. 4A and 4B.

Figures 4A, 4B:
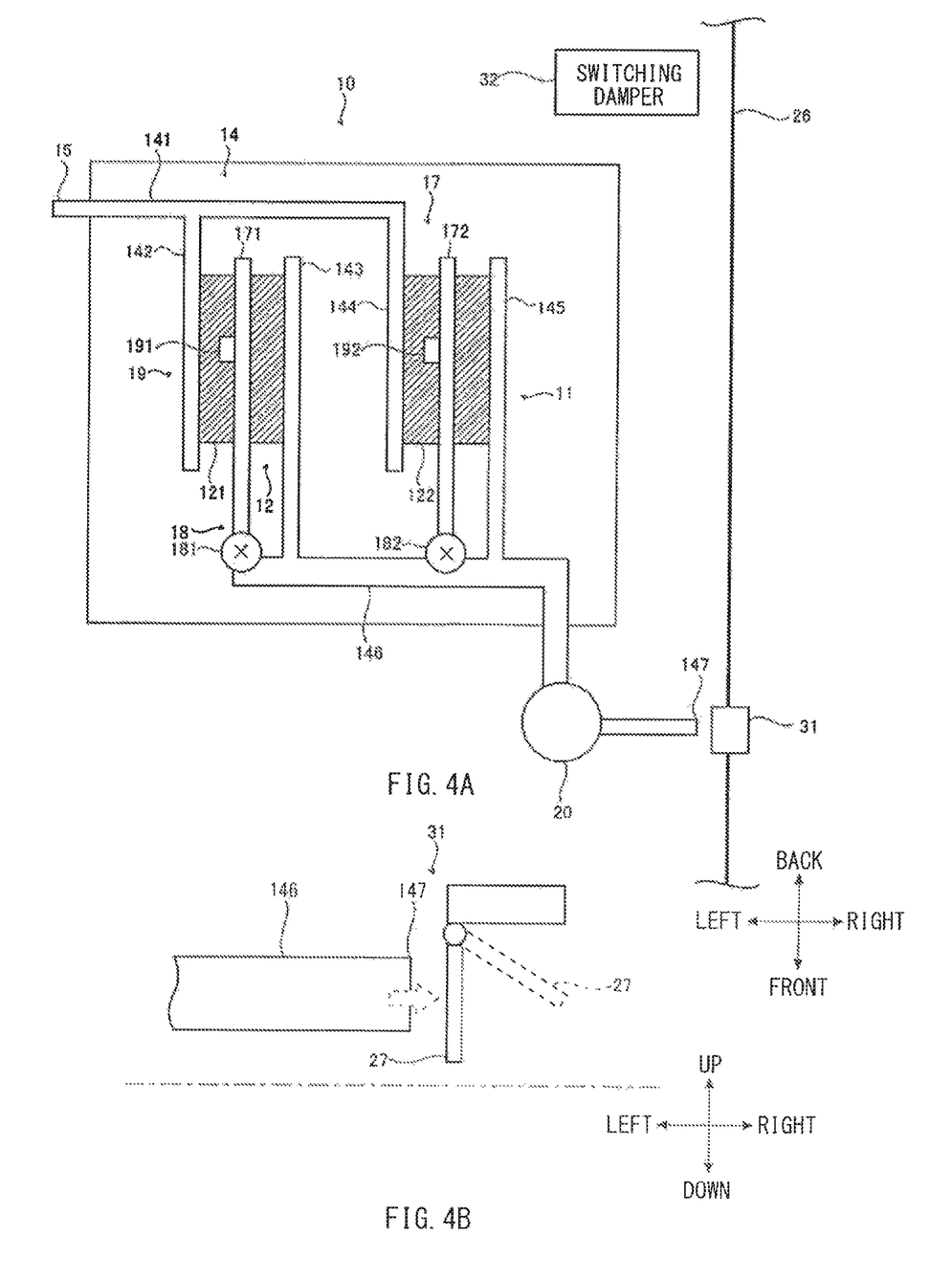
FIG. 4A is a schematic view of an exemplary air channel configuration in the vehicle battery pack according to one example embodiment of the technology.
FIG. 4B is a side view of an air vent according to one example embodiment of the technology.

FIG. 4A is a schematic view of a detailed air channel configuration in the vehicle battery pack 10. FIG. 4B is a side view of the configuration of an air vent 31.

With reference to FIG. 4A, the vehicle battery pack 10 may include the battery stacks 12, the battery-cooling-air channel 14, and the fume exhaust channel 17.

In this example embodiment, the battery stacks 12 may include battery stacks 121 and 122.

The battery-cooling-air channel 14 may be an air channel through which cooling air for the battery stacks 12 flows. The battery-cooling-air channel 14 may include battery-cooling-air channels 141 to 146 and an air channel end 147. The battery-cooling-air channels 141 to 146 may be conduits for blowing air. The air channel end 147 may be the downstream end of the battery-cooling-air channel 146.

Air may be taken in the battery-cooling-air channel 141 through the cooling air inlet 15. The downstream portion of the 141 may be coupled to the battery-cooling-air channels 142 and 144.

The battery-cooling-air channels 142 and 143 may be disposed with the battery stack 121 interposed therebetween. The battery-cooling-air channels 142 and 143 may be coupled to each other with a non-illustrated conduit through which the air used for exchanging heat with the battery stack 121 may flow. The downstream end of the battery-cooling-air channel 143 may be coupled to the battery-cooling-air channel 146.

The battery-cooling-air channels 144 and 145 may be disposed with the other of the battery stacks 122 interposed therebetween. The battery-cooling-air channels 144 and 145 may be coupled to each other with a non-illustrated conduit through which the air used for exchanging heat with the battery stack 122 may flow. The downstream end of the battery-cooling-air channel 145 may be coupled to the battery-cooling-air channel 146.

The upstream portion of the battery-cooling-air channel 146 may be coupled to the battery-cooling-air channels 143 and 145. The air channel end 147 may be provided at the downstream end of the battery-cooling-air channel 146. A battery blower fan 20 may be disposed in the battery-cooling-air channel 146. The battery blower fan 20 may be operated to cause air to flow from the cooling air inlet 15 provided at the upstream end of the battery-cooling-air channel 14 to the air channel end 147 provided at the downstream end of the battery-cooling-air channel 14.

The air channel end 147 may be disposed near the inner side of a vehicle body 26. The air vent 31 may be disposed near the air channel end 147.

The fume exhaust channel 17 may be a conduit for guiding fumes discharged from the battery stacks 12 in an abnormal state to the outside. In the example embodiment, the fume exhaust channel 17 may include fume exhaust channels 171 and 172.

The fume exhaust channel 171 may be coupled to safety valves formed in the battery cells of the battery stack 121. The downstream end of the fume exhaust channel 171 may be coupled to the battery-cooling-air channel 146 via a fume-ventilation restricting unit 181. For example, the fume-ventilation restricting unit 181 may be a film member covering the coupling site of the fume exhaust channel 171 and the battery-cooling-air channel 146. The film member may be melted by the heat of the fumes generated from the battery stack 121 in an abnormal state. Thus, in a normal state in which no fumes are generated from the battery stack 121, the film serving as the fume-ventilation restricting unit 181 may partition the battery-cooling-air channel 146 and the fume exhaust channel 171, whereas in an abnormal state in which fumes are generated from the battery stack 121, the film serving as the fume-ventilation restricting unit 181 may be melted by the heat of the fumes, causing the fume exhaust channel 171 and the battery-cooling-air channel 146 to communicate with each other. In this way, the fumes generated from the battery stack 121 may be discharged to the outside of the vehicle through the fume exhaust channel 171 and the battery-cooling-air channel 146.

Similar to the fume exhaust channel 171, the fume exhaust channel 172 may be coupled to safety valves formed in the battery cells of the battery stack 122. The downstream end of the fume exhaust channel 172 may be coupled to the battery-cooling-air channel 146 via a fume-ventilation restricting unit 182. For example, the fume-ventilation restricting unit 182 may be a film member, like the fume-ventilation restricting unit 181. In a normal state, the film serving as the fume-ventilation restricting unit 182 may partition the fume exhaust channel 172 and the battery-cooling-air channel 146, whereas in an abnormal state in which fumes are generated from the battery stack 122, the film serving as the fume-ventilation restricting unit 182 may be melted, causing the fume exhaust channel 172 and the battery-cooling-air channel 146 to communicate with each other. In this way, the fumes generated from the battery stack 122 may be discharged to the outside of the vehicle through the fume exhaust channel 172 and the battery-cooling-air channel 146.

Temperature sensors 19 that detect the temperature of the battery stacks 12 may be provided. In the example embodiment, the temperature sensors 19 may include temperature sensors 191 and 192.

The temperature sensor 191 may be disposed inside or near the fume exhaust channel 171. The temperature sensor 191 may measure the temperature of the battery cells of the battery stack 121 to detect abnormalities in the battery cells. In this example embodiment, whether or not fumes are flowing into the fume exhaust channel 171 may be determined using the temperature sensor 191, which is originally provided to detect the status of the battery stack 121. This eliminates the need for a dedicated sensor to detect the internal temperature of the fume exhaust channel 171, suppressing an increase in costs.

The temperature sensor 192 may be disposed inside or near the fume exhaust channel 172. Like the temperature sensor 191, the temperature sensor 192 may detect the temperature of the battery cells of the battery stack 122 and the internal temperature of the fume exhaust channel 172.

A switching damper 32 may be a switch that switches the state of the vehicle compartment between an inside-air circulation state and an outside-air introduction state. The switching damper 32 may make a switch between the inside-air circulation state and the outside-air introduction state in response to an operation by a passenger or an instruction from a controller 21 described below.

The configuration of the air vent 31 will now be described in detail with reference to FIG. 4B. The air vent 31 may have a vent plate 27 disposed near the air channel end 147 provided at the end of the battery-cooling-air channel 146. The vent plate 27 may be disposed to prevent foreign objects from intruding the battery-cooling-air channel 146. The upper end of the vent plate 27 may be pivotably coupled to the vehicle body 26. When the above-described battery blower fan 20 is operated to discharge air from the air channel end 147 of the battery-cooling-air channel 146, the vent plate 27 may be pivoted by the wind pressure of the air to the position indicated by the dotted line.

The air vent 31 may be disposed between a non-illustrated trim part and the vehicle body 26. Therefore, the fumes may be discharged to the outside of the vehicle without passing through the vehicle compartment in which passengers are seated.

The air vent 31 may be disposed above the floor of the vehicle indicated by the dash-dotted line to prevent water from intruding the battery-cooling-air channel 146 from the outside of the vehicle in rough weather conditions.

The vent plate 27 and the battery-cooling-air channel 146 may be disposed with a gap therebetween to prevent water from intruding the battery-cooling-air channel 146 and to allow gas to be discharged from the battery-cooling-air channel 146 to the outside.

Figure 5:
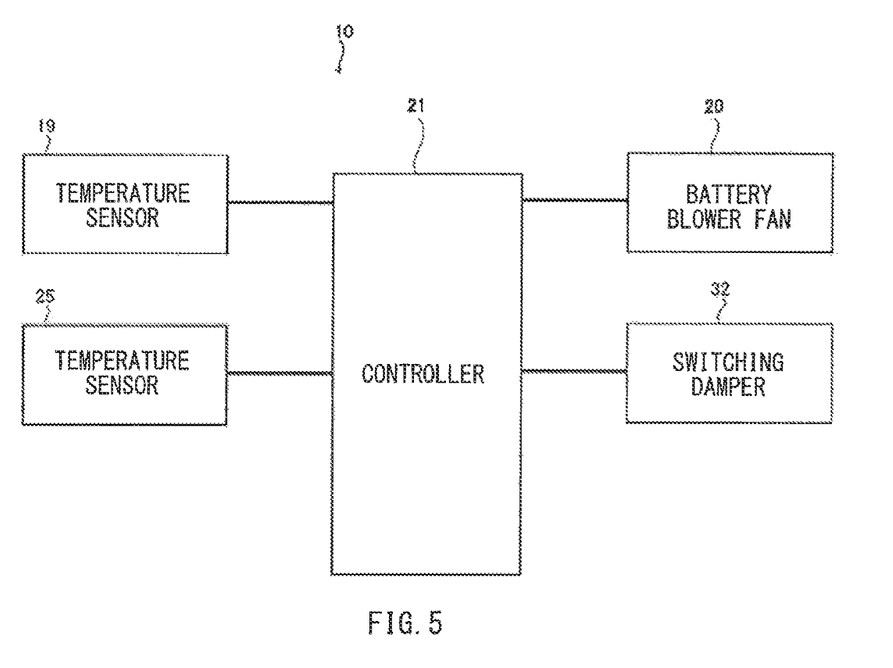
FIG. 5 is a block diagram illustrating an exemplary coupling configuration in the vehicle battery pack according to one example embodiment of the technology.

The coupling configuration in the vehicle battery pack 10 will now be described with reference to the block diagram in FIG. 5.

The controller 21 may include, for example, a CPU. The controller 21 may receive inputs from various sensors and perform a predetermined computation process. The controller 21 may control the operation of various components on the basis of the results of the predetermined computation process. The controller 21 may store various numerical constants and programs. The controller 21 may have input terminals coupled to the temperature sensors 19 and a temperature sensor 25, and output terminals coupled to the battery blower fan 20 and the switching damper 32.

Figure 6:
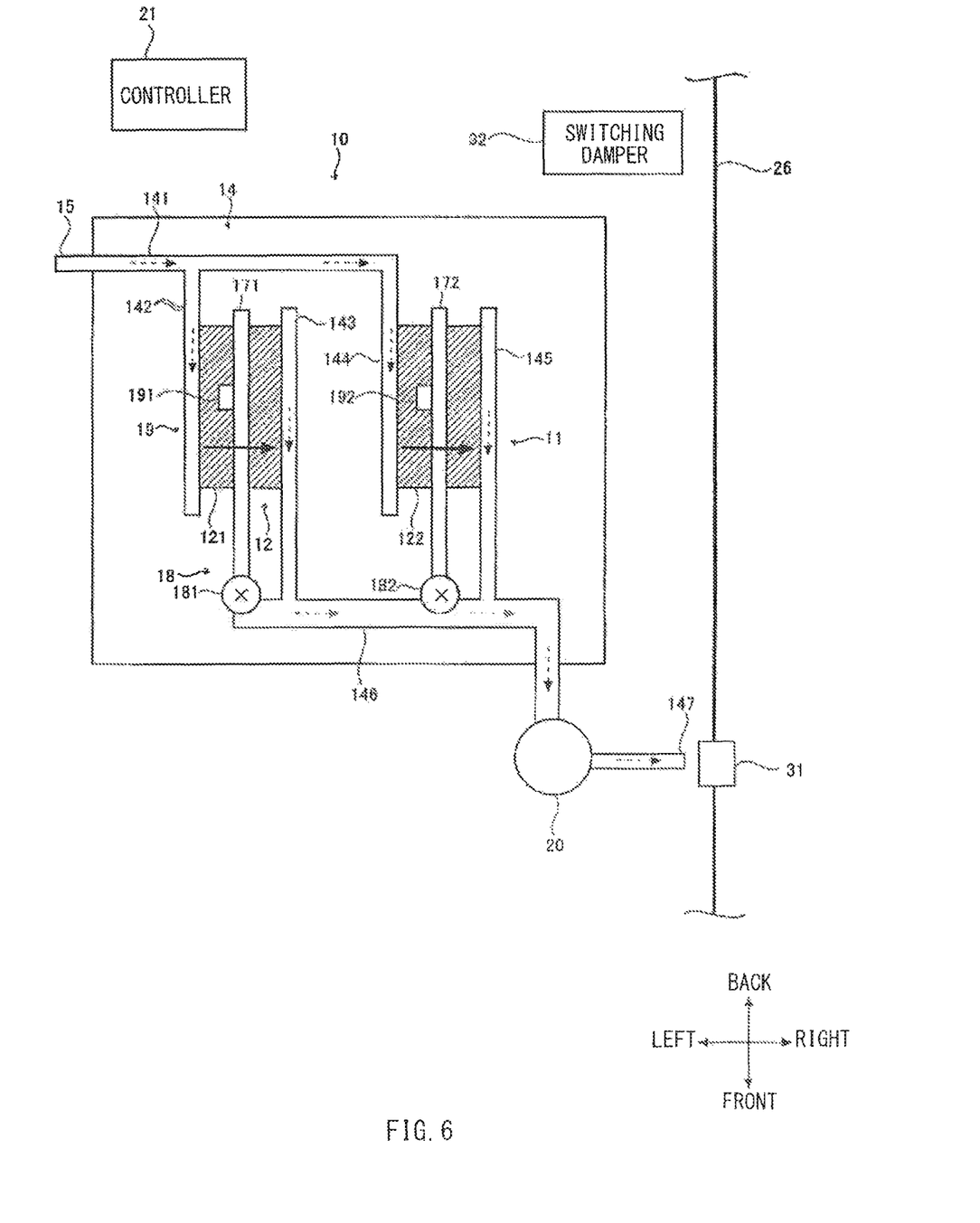
FIG. 6 is a schematic view of an exemplary air channel in the vehicle battery pack according to one example embodiment of the technology in a normal state in which no fumes are generated from the battery stacks.

With reference to FIG. 6, the control of the vehicle battery pack 10 in a normal state in which no fumes are generated from the battery stacks 12 will now be described. In the normal control, the controller 21 may control the volume of air from the battery blower fan 20 on the basis of the status of the vehicle battery pack 10, for example. When the battery blower fan 20 blows air, air may circulate inside the battery-cooling-air channel 14 to cool the battery stacks 12. In this way, the battery stacks 12 may be cooled to a temperature in a temperature range effective for charging and discharging power.

For example, when the battery blower fan 20 blows air, the air taken in through the cooling air inlet 15 to the battery-cooling-air channel 141 may be introduced to the battery-cooling-air channel 142. The air may then exchange heat with the battery cells of the battery stack 121 and be introduced to the battery-cooling-air channel 143. Similarly, the air taken in the battery-cooling-air channel 144 may exchange heat with the battery cells of the battery stack 122 and then be introduced to the battery-cooling-air channel 145. The air passing through the battery-cooling-air channels 143 and 145 may flow into the battery-cooling-air channel 146 and then be discharged through the air channel end 147 to the outside.

Since the fume-ventilation restricting unit 181 is in a closed state, the fume exhaust channel 171 and the battery-cooling-air channel 146 may not be communicating with each other. Similarly, since the fume-ventilation restricting unit 182 is in a closed state, the fume exhaust channel 172 and the battery-cooling-air channel 146 may not be communicating with each other. In this way, the air flowing through the battery-cooling-air channel 14 may be prevented from flowing into the fume exhaust channels 171 and 172. Therefore, it is possible to suppress a decrease in the capability of cooling the battery stacks 12.

The switching damper 32 may be switched between the inside-air circulation state and the outside-air introduction state in accordance with the operation by the passenger.

Figure 7:
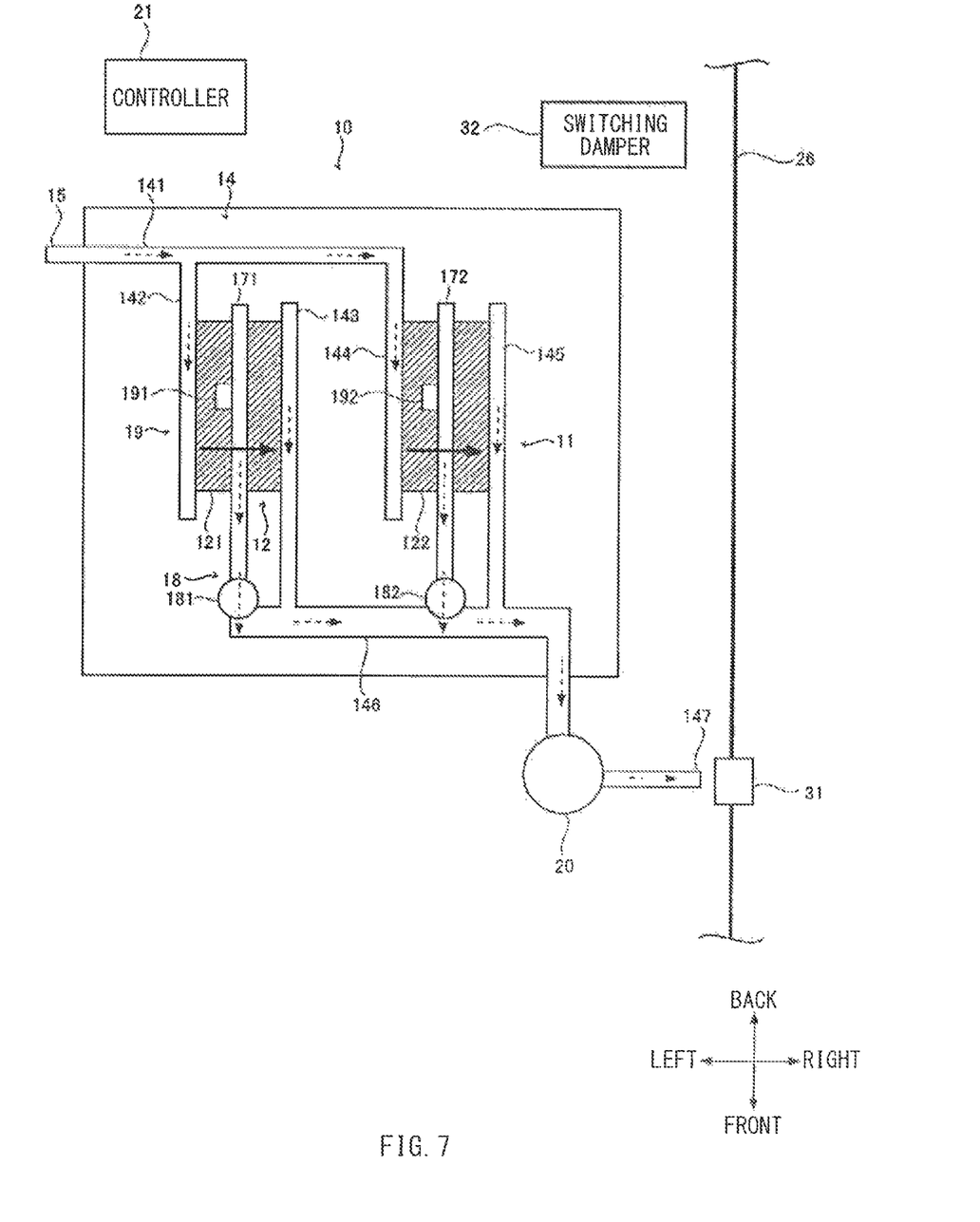
FIG. 7 is a schematic view of an exemplary air channel in the vehicle battery pack according to an embodiment of the technology in an abnormal state in which fumes are generated from the battery stacks.

The battery stacks 12 turned into an abnormal state due to internal short-circuiting or the like will now be described with reference to the schematic diagram in FIG. 7. When fumes generated from the battery stack 121 flow into the fume exhaust channel 171, the film serving as the fume-ventilation restricting unit 181 may be melted by the heat of the fumes, causing the fume exhaust channel 171 and the battery-cooling-air channel 146 to communicate with each other. As a result, the fumes may flow into the battery-cooling-air channel 146. In this example embodiment, when the temperature of the fumes flowing into the fume exhaust channel 171 detected by the temperature sensor 191 is a predetermined temperature or higher, the controller 21 may determine the presence of fumes generated from the battery stack 121. That is, the controller 21 may determine that toxic fumes generated from the battery stack 121 are flowing into the fume exhaust channel 171. The presence of the fumes is readily determined through the measurement by the temperature sensor 191 because the fumes generated from the battery stack 121 have a high temperature of approximately 100° C.

Similarly, when fumes generated from the battery stack 122 flow into the fume exhaust channel 172, the film serving as the fume-ventilation restricting unit 182 may be melted by the heat of the fumes, causing the fume exhaust channel 172 and the battery-cooling-air channel 146 to communicate with each other. As a result, the fumes may flow into the battery-cooling-air channel 146. When the temperature of the fumes flowing into the fume exhaust channel 172 detected by the temperature sensor 192 is a predetermined temperature or higher, the controller 21 may determine that the fumes generated from the battery stack 122 in the abnormal state are flowing into the fume exhaust channel 172.

When the temperature sensor 191 or 192 detects the predetermined temperature or higher and the controller 21 thereby determines that fumes have been generated from the battery stacks 12 due to a contact accident of the vehicle or the like, the controller 21 may increase the air volume of the battery blower fan 20.

For example, the controller 21 may increase the air volume of the battery blower fan 20 to a volume larger than that required to cool the battery stacks 12. In one example, the controller 21 may increase the air volume of the battery blower fan 20 to a maximum value. In this way, the fumes generated from the battery stack 121 may be discharged to the outside of the vehicle through the fume exhaust channel 171 and the battery-cooling-air channel 146. Since the air volume of the battery blower fan 20 is increased, it is possible to reliably push up the vent plate 27 illustrated in FIG. 4B. Similarly, the fumes generated from the battery stack 122 may be discharged to the outside of the vehicle through the fume exhaust channel 172 and the battery-cooling-air channel 146.

At this time, the controller 21 may switch the switching damper 32 from the inside-air circulation state to the outside-air introduction state. By switching to the outside-air introduction state, it is possible to prevent the fumes generated from the battery stack 121 from accumulating in the vehicle compartment. The controller 21 may also activate an air conditioning fan to cool or heat the vehicle compartment. In this way, it is possible to prevent the fumes from accumulating in the vehicle compartment.

The above-described fume exhaust process of the battery stacks 12 may be continued until the temperature of the battery stacks 12 decreases. For example, the controller 21 may increase the air volume of the battery blower fan 20 until the temperatures of the battery stacks 12 measured by the temperature sensors 19 fall below a predetermined value.

When the temperatures of the battery stacks 12 measured by the temperature sensors 19 become a predetermined value or lower, it may be determined that the volume of fumes generated from the battery stacks 12 has significantly decreased. Therefore, the controller 21 may increase the air volume of the battery blower fan 20 for an additional predetermined time to discharge the fumes to the outside of the vehicle in a safer manner. The length of the predetermined time may vary depending on the type and volume of the battery stacks 12.

After the predetermined time, the battery blower fan 20 may stop. Through such an operation of the vehicle battery pack 10, it is possible to reliably discharge toxic fumes generated from the battery stacks 12 to the outside of the vehicle and secure the safety of the passengers in the vehicle compartment.

Figure 8A:
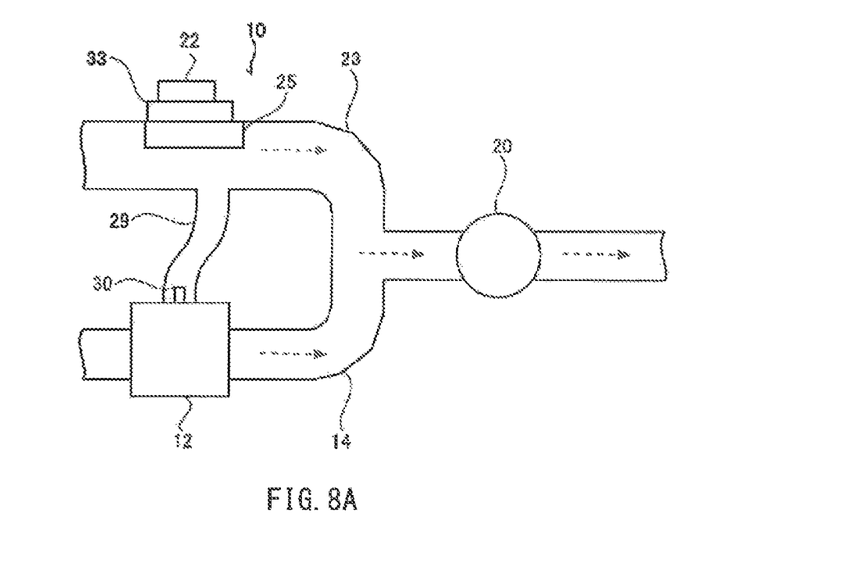
FIG. 8A is a schematic view of an exemplary air channel configuration to cool a power converter and the battery stacks in the vehicle battery pack according to one example embodiment of the technology.
Figure 8B:
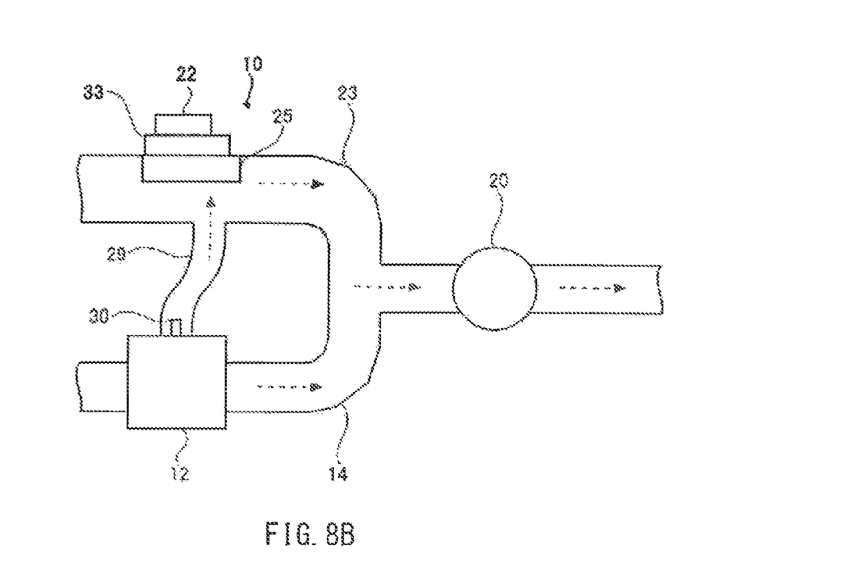
FIG. 8B is a schematic view illustrating an example state where fumes are discharged through a power-converter cooling-air channel.

Another exemplary configuration of a vehicle battery pack 10 will now be described with reference to the schematic diagram in FIGS. 8A and 8B. In this example, the vehicle battery pack 10 may discharge fumes from the battery stack 12 through the power-converter cooling-air channel 23. FIG. 8A schematically illustrates the air channel configuration of the vehicle battery pack 10 in a normal state in which no fumes are generated from the battery stack 12. FIG. 8B schematically illustrates the air channel configuration in an abnormal state in which fumes are generated from the battery stack 12. In FIGS. 8A and 8B, the flow directions in the air channels are indicated by the dotted arrows.

With reference to FIG. 8A, the vehicle battery pack 10 may include the battery-cooling-air channel 14 and the power-converter cooling-air channel 23. The air after being used to cool the battery stack 12 may flow into the battery-cooling-air channel 14. The air after being used to cool a power converter 22 may flow into the power-converter cooling-air channel 23. The battery blower fan 20 may be disposed in the air channel where the battery-cooling-air channel 14 merges with the power-converter cooling-air channel 23. The air blown from the battery blower fan 20 may be discharged to the outside of the vehicle. The cross-sectional area of the power-converter cooling-air channel 23 may be larger than the cross-sectional area of the battery-cooling-air channel 14. In this way, the volume of air flowing through the power-converter cooling-air channel 23 may be larger than the volume of air flowing through the battery-cooling-air channel 14 while the battery blower fan 20 is operating.

The power converter 22 may include a power converting circuit, such as a converter or an inverter, that converts the power charged to or discharged from the battery stack 12. The power converter 22 may exchange heat with the air flowing through the power-converter cooling-air channel 23 through a heat radiator 33 facing the power-converter cooling-air channel 23.

A fume exhausting portion 30 of the battery stack 12 and the power-converter cooling-air channel 23 may be coupled with a coupling air channel 29. The coupling site of the coupling air channel 29 and the power-converter cooling-air channel 23 may be disposed near the heat radiating site of the power converter 22. Optionally, the fume-ventilation restricting unit 181 illustrated in FIG. 4A may be disposed at the coupling site of the coupling air channel 29 and the power-converter cooling-air channel 23.

The temperature sensor 25 may be disposed near the power converter 22. The temperature sensor 25 may be a sensor to detect the temperature of the power converter 22. The temperature sensor 25 may also serve as a sensor to detect fumes intruding into the power-converter cooling-air channel 23 through the coupling air channel 29.

When fumes generated in an abnormal state are discharged from the fume exhausting portion 30 of the battery stacks 12, the fumes may reach the power-converter cooling-air channel 23 through the coupling air channel 29, as illustrated in FIG. 8B. When the temperature sensor 25 detects a predetermined temperature or higher as a result of the fumes having a temperature of approximately 100° C. flowing into the power-converter cooling-air channel 23, the air volume of the battery blower fan 20 may be increased. For example, the air volume of the battery blower fan 20 may be increased to a maximum value. This allows the toxic fumes to be discharged to the outside through the power-converter cooling-air channel 23 having a large cross-sectional area.

Some example embodiments of the disclosure have been described above. The example embodiments of the disclosure are not limited to these example embodiments and may be modified within the scope of the technology. The example embodiments described above may be combined as appropriate.

In some example embodiments described above, for example, the fume-ventilation restricting unit 181 may be a film that melts at a high temperature. Alternatively, a mechanical damper that opens and closes in response to an instruction from the controller 21 may be employed.

In some example embodiments described above, the fumes generated from the battery stack 121 may be detected by the temperature sensor 191 that detects the temperature of the battery stack 121. Alternatively, a dedicated temperature sensor that detects the fumes generated from the battery stack 121 may be disposed in the fume exhaust channel 171. With reference to FIGS. 4A and 4B, the dedicated sensor may be disposed inside the battery-cooling-air channel 146 near the upstream side of the battery blower fan 20.

In some example embodiments described above, the fumes generated from the battery stacks 12 may be detected on the basis of temperature. In addition to this, a fluctuation in the voltages of the battery stacks 12 may be detected to accurately detect the fumes generated from the battery stacks 12 due to an abnormality.

Example effects achieved in the embodiments described above will be described below.

By providing a common channel serving as the path for discharging gas generated in an abnormal state from the battery, and the air channel for circulating cooling air, it is possible to simplify the overall configuration of the air channel in the battery pack. In such a case, it is necessary to secure the safety of the passengers during the generation of gas. Rechargeable batteries including lithium-ion batteries as battery cells can generate highly toxic gas from the battery cells in an abnormal state. Therefore, it can be difficult to sufficiently secure the safety of the passenger by merely causing the gas to flow through the cooling air channel. On the other hand, providing a dedicated gas discharge channel for discharging the gas generated in an abnormal state can require many sensors to be disposed around the gas discharge channel and the battery cells. This can significantly increase costs. Therefore, it is desirable to provide a discharge system that has a simple air channel configuration through which the gas generated in an abnormal state is discharged with safety.

In the example embodiments described above, the fume exhaust channel may be coupled to the battery-cooling-air channel, and the fume-ventilation restricting unit may be disposed between the battery-cooling-air channel and the fume exhaust channel, i.e., at the merging site of the two channels. In this way, when fumes are generated from the battery due to an abnormality, the fumes may be discharged to the outside through the fume exhaust channel and the battery-cooling-air channel. This may allow the battery-cooling-air channel to be used as a path for discharging the fumes. Therefore, it is possible to simplify the configuration of the vehicle battery pack. By enabling an increase in the air volume of the blower fan on the basis of the output from the temperature sensor, i.e., the temperature detected by the temperature sensor, it is possible to increase the air volume of the blower fan when the generation of fumes is detected and thereby satisfactorily discharge the fumes to the outside of the vehicle. Therefore, it is possible to prevent the toxic fumes from having an adverse effect on the passengers. It is also possible to achieve the effects, including the simplification of the configuration related to fume discharge and the security of safety, by coupling the fume exhaust channel to the power-converter cooling-air channel instead of the battery-cooling-air channel, and disposing the fume-ventilation restricting unit between the power-converter cooling-air channel and the fume exhaust channel.

By enabling the switching damper to be switched to the outside-air introduction state in response to an output from the temperature sensor when the generation of fumes is detected, it is possible to prevent the toxic fumes from accumulating in the vehicle compartment.

By forming the fume-ventilation restricting unit with a film that melts when it comes into contact with fumes, it is possible to simplify the configuration of the fume-ventilation restricting unit.

By disposing the end of the battery-cooling-air channel above, e.g., directly above, the floor of the vehicle, it is possible to prevent water from intruding from the outside of the vehicle into the battery-cooling-air channel. By disposing the air vent at the end of the battery-cooling-air channel and disposing the end of the battery-cooling-air channel and the air vent above the floor of the vehicle, it is possible to achieve a more satisfactory effect in preventing the intrusion of water.

By using the battery temperature sensor and enabling detection of the generation of fumes by the battery temperature sensor, the temperature sensor may be used for both the detection of an abnormality and the detection of the battery temperature. This eliminates the need for a dedicated temperature sensor that detects the generation of fumes, suppressing an increase in costs.

By coupling the fume exhaust channel to the battery-cooling-air channel through the power-converter cooling-air channel and allowing the fume generated in an abnormal state to be discharged to the outside through the power-converter cooling-air channel, it is possible to increase the flexibility of the design and further simplify the overall configuration of the battery pack. Since the power-converter cooling-air channel generally has a blowing force larger than that of the battery-cooling-air channel, it is possible to more reliably discharge the toxic fumes.

By using the temperature sensor as a power-converter temperature sensor and enabling the detection of the generation of fumes by the power-converter temperature sensor, it is possible to eliminate the need for a dedicated temperature sensor that detects the generation of fumes and thus suppress an increase in costs.

The invention claimed is:

1. A vehicle battery pack for an electric vehicle, the vehicle battery pack comprising:
   a battery that comprises a safety valve, the safety valve being configured to release fumes from inside of the battery in an abnormal state wherein the fumes are generated from the battery;
   a battery-cooling-air channel having an inlet end and an outlet end through which cooling air is to flow from inside the vehicle to outside the vehicle, the cooling air being directed to cool the battery;
   a fume exhaust channel through which the fumes are to flow, the fume exhaust channel being coupled to the safety valve and the battery-cooling-air channel and configured to introduce the fumes from the safety valve to the battery-cooling-air channel in the abnormal state;
   a fume-ventilation restricting unit disposed at a merging site where the battery-cooling-air channel and the fume exhaust channel are to merge, the fume-ventilation restricting unit being configured to
      close off the fume exhaust channel from the battery-cooling-air channel in a normal state in which the fumes are not generated, and
      cause the battery-cooling-air channel and the fume exhaust channel to communicate with each other in the abnormal state in which the fumes are generated;
   a temperature sensor configured to detect a temperature of the fumes;
   a blower fan configured to blow the cooling air; and
   a controller configured to
      control the blower fan, and
      increase an air volume of the blower fan on a basis of the temperature detected by the temperature sensor, and wherein
   in the normal state, with the blower fan blowing cooling air, the battery-cooling-air channel and the fume exhaust channel are configured as to be closed off from each other from the inlet end to the outlet end of the battery-cooling-air channel.

2. The vehicle battery pack according to claim 1, further comprising
   a switching damper capable of switching a vehicle-compartment air-conditioner between an inside-air circulation state and an outside-air introduction state, wherein
   the controller switches the switching damper to the outside-air introduction state on a basis of the temperature detected by the temperature sensor.

3. The vehicle battery pack according to claim 2, wherein the fume ventilation restricting unit comprises a film to be melted by contact with the fumes at or above a predetermined temperature,
   the temperature sensor disposed inside or near the fume exhaust channel,
   the controller is configured to increase the air volume of the blower fan when the temperature detected by the temperature sensor is the predetermined temperature or higher.

4. The vehicle battery pack according to claim 2, wherein the outlet end of the battery-cooling-air channel that discharges the cooling air after being used to cool the battery is disposed above a floor of the electric vehicle.

5. The vehicle battery pack according to claim 4, further comprising
   a movable air vent disposed at the outlet end of the battery-cooling-air channel, the air vent being configured to
      close an opening at the end of the battery-cooling-air channel in the normal state, and to open the opening at the outlet end of the battery-cooling-air channel in accordance with an increase in the air volume of the blower fan.

6. The vehicle battery pack according to claim 2, wherein the temperature sensor comprises a battery temperature sensor configured to detect a temperature of the battery.

7. The vehicle battery pack according to claim 1, wherein the fume ventilation restricting unit comprises a film to be melted by contact with the fumes at or above a predetermined temperature,
the temperature sensor disposed inside or near the fume exhaust channel,
the controller is configured to increase the air volume of the blower fan when the temperature detected by the temperature sensor is the predetermined temperature or higher.

8. The vehicle battery pack according to claim 1, wherein the outlet end of the battery-cooling-air channel that discharges the cooling air after being used to cool the battery is disposed above a floor of the electric vehicle.

9. The vehicle battery pack according to claim 8, further comprising
a movable air vent disposed at the outlet end of the battery-cooling-air channel, the air vent being configured to
close an opening at the outlet end of the battery-cooling-air channel in the normal state, and
to open the opening at the outlet end of the battery-cooling-air channel in accordance with an increase in the air volume of the blower fan.

10. The vehicle battery pack according to claim 1, wherein the temperature sensor comprises a battery temperature sensor configured to detect a temperature of the battery.

11. The vehicle battery pack according to claim 1, wherein the blower fan is operated by the controller so as to operate during the normal state at a first blowing level, and to operate at a second blowing level that is higher than the first blowing level during the abnormal state.

12. A vehicle battery pack for an electric vehicle, the vehicle battery pack comprising:
a battery that comprises a safety valve, the safety valve being configured to release fumes from inside of the battery in an abnormal state wherein the fumes are generated from the battery;
a power converter;
a power-converter cooling-air channel through which cooling air is to flow from inside the vehicle to outside the vehicle, the cooling air being directed to cool the power converter;
a fume exhaust channel through which the fumes are to flow, the fume exhaust channel being coupled to the safety valve and the power-converter cooling-air channel and configured to introduce the fumes from the safety valve to the power-converter cooling-air channel;
a fume-ventilation restricting unit disposed at a merging site where the power-converter cooling-air channel and the fume exhaust channel are to merge, the fume-ventilation restricting unit being configured to
close off the fume exhaust channel from the power-converter cooling-air channel in a normal state in which the fumes are not generated, and
cause the power-converter cooling-air channel and the fume exhaust channel to communicate with each other in an abnormal state in which the fumes are generated;
a temperature sensor configured to detect a temperature of the fumes;
a blower fan configured to blow the cooling air; and
a controller configured to
control the blower fan, and
increase an air volume of the blower fan on a basis of the temperature detected by the temperature sensor, and wherein
the fume-ventilation restricting unit precludes exhaust channel communication with cooling air while the blower fan is blowing during the normal state.

13. The vehicle battery pack according to claim 12, wherein the temperature sensor comprises a power-converter temperature sensor configured to detect a temperature of the power converter.

14. A vehicle battery pack for an electric vehicle, the vehicle battery pack comprising:
a battery that comprises a safety valve, the safety valve being configured to release fumes from inside of the battery in an abnormal state wherein the fumes are generated from the battery;
a battery-cooling-air channel having an inlet and an outlet and through which cooling air is to flow from inside the vehicle to outside the vehicle, the cooling air being directed to cool the battery;
a fume exhaust channel through which the fumes are to flow, the fume exhaust channel being coupled to the safety valve and the battery-cooling-air channel and configured to introduce the fumes from the safety valve to the battery-cooling-air channel in the abnormal state;
a fume-ventilation restricting unit disposed at a merging site where the battery-cooling-air channel and the fume exhaust channel are to merge, or, alternatively, disposed at a merging site where the fume exhaust channel and a power converter cooling channel merge, with the power converter cooling channel feeding into the battery-cooling-air channel downstream of the battery, the fume-ventilation restricting unit being configured to
close off the fume exhaust channel from the battery-cooling-air channel in a normal state in which the fumes are not generated, and
cause the battery-cooling-air channel and the fume exhaust channel to communicate with each other in the abnormal state in which the fumes are generated;
a temperature sensor configured to detect a temperature of the fumes;
a blower fan configured to blow the cooling air; and
a controller configured to
control the blower fan, and
increase an air volume of the blower fan on a basis of the temperature detected by the temperature sensor, and
wherein the fume-ventilation restricting unit precludes exhaust channel communication with cooling air while the blower fan is blowing during the normal state.

15. The vehicle battery pack according to claim 14, further comprising:
a power converter coupled to the battery and configured to convert power; and
the power-converter cooling-air channel through which cooling air is to flow, the cooling air being directed to cool the power converter, wherein,
the fume exhaust channel is coupled to the battery-cooling-air channel and configured to introduce the fumes to the battery-cooling-air channel through the power-converter cooling-air channel, the fume-ventilation restricting unit is disposed at a coupling site where the fume exhaust channel and the power-converter cooling-air channel are coupled, and when the fumes are generated, the fumes are discharged through the power-converter cooling-air channel and then to the battery-cooling-air channel.

16. The vehicle battery pack according to claim 15, wherein the temperature sensor comprises a power-converter temperature sensor configured to detect a temperature of the power converter.

17. The vehicle battery pack according to claim 14, further comprising a switching damper capable of switching a vehicle-compartment air-conditioner between an inside-air circulation state and an outside-air introduction state, wherein the controller switches the switching damper to the outside-air introduction state on a basis of the temperature detected by the temperature sensor.

18. The vehicle battery pack according to claim 14, further comprising:

a power converter coupled to the battery and configured to convert power; and the power converter cooling channel through which cooling air is to flow, the cooling air being directed to cool the power converter, wherein, the fume exhaust channel is coupled to the battery-cooling-air channel and configured to introduce the fumes to the battery-cooling-air channel through the power converter cooling channel, the fume-ventilation restricting unit is disposed at a coupling site where the fume exhaust channel and the power converter cooling channel are coupled, and when the fumes are generated, the fumes are discharged through the power converter cooling channel.

19. The vehicle battery pack according to claim 14, wherein the blower fan is operated by the controller so as to operate during the normal state at a first blowing level, and to operate at a second blowing level that is higher than the first blowing level during the abnormal state.

20. The vehicle battery pack according to claim 14, wherein the fume-ventilation restricting unit is disposed at the merging site where the battery-cooling-air channel and the fume exhaust channel merge.

* * * * *